(12) United States Patent
Chen

(10) Patent No.: US 9,276,494 B2
(45) Date of Patent: Mar. 1, 2016

(54) SWITCHING POWER SUPPLY DEVICE, INCLUDING A ZERO CURRENT DETECTING

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 40 days.

(21) Appl. No.: 13/893,442

(22) Filed: May 14, 2013

(65) Prior Publication Data

US 2013/0308359 A1 Nov. 21, 2013

(30) Foreign Application Priority Data

May 21, 2012 (JP) ................................. 2012-115273

(51) Int. Cl.
*H02M 7/217* (2006.01)
*H02M 1/42* (2007.01)

(52) U.S. Cl.
CPC ............ *H02M 7/217* (2013.01); *H02M 1/4225* (2013.01); *Y02B 70/126* (2013.01)

(58) Field of Classification Search
USPC .......... 323/222, 224, 228, 235, 265, 271, 273
See application file for complete search history.

(56) References Cited

U.S. PATENT DOCUMENTS

| 6,657,877 | B2 * | 12/2003 | Kashima et al. | ............... 363/127 |
| 7,936,152 | B2 * | 5/2011 | Shimizu | ........................ 323/222 |
| 8,411,397 | B2 * | 4/2013 | Akama | ............................ 361/18 |
| 8,823,339 | B2 * | 9/2014 | Lee et al. | ....................... 323/235 |
| 2010/0165683 | A1 * | 7/2010 | Sugawara | ...................... 363/126 |
| 2010/0246226 | A1 * | 9/2010 | Ku | ....................... H02M 1/4225 363/126 |
| 2011/0141631 | A1 * | 6/2011 | Yabuzaki et al. | ................ 361/18 |

FOREIGN PATENT DOCUMENTS

| JP | 2010-220330 A | 9/2010 |
| JP | 2011-103737 A | 5/2011 |

* cited by examiner

*Primary Examiner* — Timothy J Dole
*Assistant Examiner* — Ishrat Jamali
(74) *Attorney, Agent, or Firm* — Rossi, Kimms & McDowell LLP

(57) ABSTRACT

In some aspects of the invention, a zero current detecting circuit of a switching power supply device detects a gradient of the current flowing in an inductor in the OFF state of the switching element and detects the timing at which the current through the inductor becomes zero corresponding to the detected gradient of the inductor current. Specifically, the zero current detecting circuit receives a signal for controlling ON/OFF driving of the switching element and a voltage signal proportional to the current flowing through the inductor in an OFF state of the switching element. The voltage signal can be compared sequentially with first and second comparison reference voltages to control charging and discharging of a capacitor. Further, the zero current detecting circuit can detect a timing at which the charging and discharging voltage of the capacitor as the timing of zero current flowing through the inductor.

4 Claims, 6 Drawing Sheets

SWITCHING POWER SUPPLY DEVICE, INCLUDING A ZERO CURRENT DETECTING

BACKGROUND OF THE INVENTION

1. Field of the Invention

Embodiments of the invention relate to switching power supply devices that receive a rectified AC voltage and deliver a stable DC voltage.

2. Description of the Related Art

A power factor correction (PFC) converter of a step-up chopper type, a type of switching power supply device, generates a stable DC output voltage while generating an input current proportional to an input voltage utilizing self-excited oscillation of an inductor. The PFC converter has excellent characteristics including small-size, high efficiency, and production at a low cost. FIG. 4 shows a schematic construction of this type of switching power supply device, which is a power factor correction converter, in which the reference symbol BD designates a rectifier circuit that rectifies an AC power given from an AC power supply through an input filter F and delivers the rectified voltage to the switching power supply device.

This switching power supply device is provided with an inductor L connected to the rectifier circuit BD and a switching element Q that forms a current path from the rectifier circuit BD through the inductor L in the ON state of the switching element Q. The switching power supply device is further provided with a diode D that forms a current path between the inductor L and an output capacitor C2 in the OFF state of the switching element Q and a control circuit CONT that ON/OFF drives the switching element Q to control the current flowing through the inductor L. The symbol C1 designates an input capacitor.

The switching element Q provides the inductor L with a current proportional to the input voltage applied to the switching power supply device in the ON state of the switching element Q. The current flowing through the inductor L, inductor current, rises from zero over the ON period of the switching element Q. Upon turning OFF of the switching element Q, the voltage across the inductor L changes its polarity and the inductor current is delivered to the output capacitor C2 in the output side through the diode D. When the inductor current flowing out from the inductor L becomes zero, the switching element Q is turned ON again to transfer to the next operation cycle. This procedure is repeated. Japanese Unexamined Patent Application Publication No. 2010-220330 (also referred to herein as "Patent Document 1") and Japanese Unexamined Patent Application Publication No. 2011-103737 (also referred to herein as "Patent Document 2") disclose this kind of procedure.

The control circuit CONT for conducting the ON/OFF control of the switching element Q is a power supply driving IC to drive directly a MOS-FET used for the switching element Q. The control circuit CONT comprises an error detector 11 for detecting an error Comp (comparison reference voltage) that is a difference between an output voltage Vo detected by division with series-connected resistors R1 and R2, and a preset target output voltage. An ON width generating circuit 12 indicated in FIG. 4 generates a signal 'OFF' that determines an ON width Ton of the switching element Q, which is a MOS-FET, based on the error Comp detected by the error detector 11 and delivers the signal 'OFF' to a flip-flop 13 to reset the flip-flop.

The flip-flop 13 is set to make the output q thereof High and reset to make the output q Low. Receiving the output q from the flip-flop 13, a driving circuit 14 ON/OFF drives the switching element Q. Thus, the ON width generating circuit 12 resets the flip-flop 13 with the output signal 'OFF' to turn OFF the switching element Q.

The control circuit CONT comprises a zero current detecting circuit 15 that detects an inductor current Ir from a negative voltage developing across a resistor R3 inserted in a current path including the inductor L in particular in a power supply line at the negative side. The zero current detecting circuit 15 compares a voltage Vcs developing across the resistor R3 in proportion to the inductor current Ir with a preset reference voltage Vref, and delivers a zero current detecting signal Vzcd when the inductor current Ir reaches the zero level. The reference voltage Vref is set at as nearly to 0 mV as possible, but generally in the range of −10 mV to −5 mV in view of power supply noise and circuit parameter variation.

In order to turn ON the switching element Q at the timing of the lowest voltage, a valley of voltage, undergone by the switching element Q, the zero current detecting signal Vzcd delivered by the zero current detecting circuit 15 is delayed by a certain period of time Td in a delay circuit 16 and then given to the flip-flop 13 to set the flip-flop 13. Thus, the zero current detecting circuit 15 sets the flip-flop 13 with the zero current detecting signal Vzcd and turns ON the switching element Q.

The delay of the zero current detecting signal Vzcd in the delay circuit 16 is briefly described below. In the OFF state of the switching element Q, the switching element Q undergoes a high voltage developed at the inductor L, and the inductor current Ir decreases caused by flowing out of the current from the inductor L. When the inductor current Ir returns to the zero level, a critical point, the zero current detecting circuit 15 detects the zero level and delivers the zero current detecting signal Vzcd. The inductor current, however, swings further down to negative side due to resonant oscillation created by the inductance of the inductor L and a parasitic capacitance component in the circuit of the current path including the inductor L. The resonant oscillation also causes oscillation in the voltage undergone by the switching element Q. The voltage on the switching element Q is the lowest, a valley of voltage oscillation, at the moment when the inductor current Ir changes from a negative value to a positive value.

The delay circuit 16 delays the zero current detecting signal Vzcd after the zero current detection so as to turn ON the switching element Q at the timing of the lowest voltage, at a valley of the voltage resonant oscillation, undergone by the switching element Q. The delay time Td of the delay circuit 16 is fixedly set in general corresponding to the circuit parameters of the switching power supply device 1. Owing to the delay of the zero current detecting signal Vzcd performed in the delay circuit 16, switching loss on turning ON of the switching element Q is limited to the smallest and the surge current on turning ON of the switching element Q is also limited to the smallest.

The inductor current Ir varies with time corresponding to ON/OFF operation of the switching element Q. The rate of the variation, the gradient, depends on the input voltage Vi, the output voltage Vo, and the inductance of the inductor L, and other parameters in the circuit. The variation of the inductor current Ir also changes a rate of variation, a gradient, of the voltage Vcs, which is proportional to the inductor current Ir. As a result, even though the zero current detecting signal Vzcd is generated based on the comparison between the voltage Vcs and the reference voltage Vref, a discrepancy time Tzcd occurs, as shown in FIG. 5, between the timing at critical point arrival at which the inductor current Ir actually returns to zero from a negative value and the timing of the lowest voltage, the valley of voltage oscillation, on the switching element Q.

Because the inductor current Ir varies relating to an instantaneous value of the input voltage Vi varying with the phase as shown in FIG. 6, the discrepancy time Tzcd also varies with the input voltage Vi. At a specific example of phase A with a low input voltage Vi, the gradient of the voltage Vcs is large to make the discrepancy time Tzcd small. In contrast, at the phase D with a high input voltage Vi, the gradient of the voltage Vcs is small making the discrepancy time Tzcd large.

Despite this circumstance, the delay time Td is fixedly set in the delay circuit 16. As a consequence, at a phase of high input voltage Vi, for example, the switching element Q operates in a continuous mode. Further, even if the delay time Td for the zero current detecting signal Vzcd is adjusted so that the switching element Q is turned ON at the timing of the lowest voltage on the switching element Q, the switching element Q is turned ON at a timing earlier or later than the valley of voltage oscillation due to variation of the discrepancy time Tzcd. Therefore, the switching efficiency deteriorates and the power factor decreases. Thus, there exist certain shortcomings in the related art.

SUMMARY OF THE INVENTION

Embodiments of the invention address these and other shortcomings. Some embodiments provide a switching power supply device having a simple structure that prevents deterioration of efficiency and decrease of power factor owing to turning ON of the switching element at the optimum timing, or at the valley of voltage oscillation, despite variation of the input voltage Vi.

Some embodiments do not utilize the voltage Vcs proportional to the inductor current Ir described above but focuses on the gradient of the voltage Vcs (ramp voltage) to detect the critical point of zero inductor current. Thus, the switching element is turned ON at an appropriate timing, which is at the valley of voltage oscillation.

A switching power supply device according to some embodiments has: an inductor connected to a rectifier circuit for rectifying AC power, a switching element forming a current path from the rectifier circuit through the inductor in an ON state of the switching element; a diode forming a current path from the inductor to an output capacitor in an OFF state of the switching element; and a control circuit controlling electric current flowing through the inductor by ON/OFF driving the switching element; the control circuit comprising: a zero current detecting circuit that detects a gradient of current flowing through the inductor in an OFF state of the switching element and detects a timing of zero current flowing through the inductor corresponding to the detected gradient to turn ON the switching element, and an ON width generating circuit that compares a comparison reference voltage generated based on an output voltage obtained at the output capacitor with a ramp voltage generated upon turning ON of the switching element to determine an ON width of the switching element, and turns OFF the switching element.

Specifically, in some embodiments, the zero current detecting circuit gives an output signal of the detected timing of zero current flowing in the inductor (inductor current) to an output control circuit for ON/OFF driving the switching element through a delay circuit for delaying by a predetermined period of time, the output control circuit comprising a flip-flop that is reset by an output of the ON width generating circuit and set by an output of the delay circuit, and a driving circuit that generates a driving signal for the switching element according to an output of the flip-flop.

In some embodiments, the zero current detecting circuit receives a signal for controlling ON/OFF driving of the switching element, receives a voltage signal proportional to the current flowing through the inductor in an OFF state of the switching element, compares the voltage signal sequentially with a first comparison reference voltage and a second comparison reference voltage, detects a gradient of the inductor current, and detects the timing of zero current (critical point) flowing through the inductor corresponding to the detected gradient of the inductor current.

In some embodiments, the zero current detecting circuit preferably comprises a capacitor that is charged by a first constant current source and discharged by a second constant current source, charges the capacitor by the first constant current source after the voltage signal proportional to the inductor current exceeds the first comparison reference voltage until the voltage signal reaches the second comparison reference voltage, then discharges a charged voltage of the capacitor by the second constant current source, and detects a timing at which the charged voltage of the capacitor reaches a third comparison reference voltage through the discharge as the timing of zero current of the inductor current.

In some embodiments, it is possible that the zero current detecting circuit detects the gradient of the current flowing through the inductor from a differential value of the inductor current in the OFF state of the switching element and detects the timing of zero current of the inductor current corresponding to the detected gradient of current.

In some embodiments, in the switching power supply device having the construction described above, consideration is directed to a gradient of the inductor current to detect the timing of zero current, or the critical point, flowing in the inductor. Consequently, turning ON of the switching element can be carried out at the timing of lowest voltage on the switching element Q irrespective of input voltage variation. Therefore, the switching element does not operate in a continuous mode even when the input voltage Vi is high. Because the switching element is surely turned OFF at the timing of the lowest voltage, or at the valley of voltage oscillation, undergone by the switching element, the power factor is improved and the switching efficiency does not deteriorate.

In some embodiments, because the zero current detection is conducted with attention directed to the gradient of the inductor current, the absolute value of a comparison reference voltage can be high for the zero current detection. Thus, the zero current detection can be performed at a higher accuracy than in the conventional technology where the comparison reference voltage is set at as nearly to zero volts as possible. Moreover, the zero current detection can be conducted without the influence of the noise superimposed on the power supply line.

DETAILED DESCRIPTION

The following describes a switching power supply device according to an embodiment of the present invention with reference to the accompanying drawings.

Figure 1:
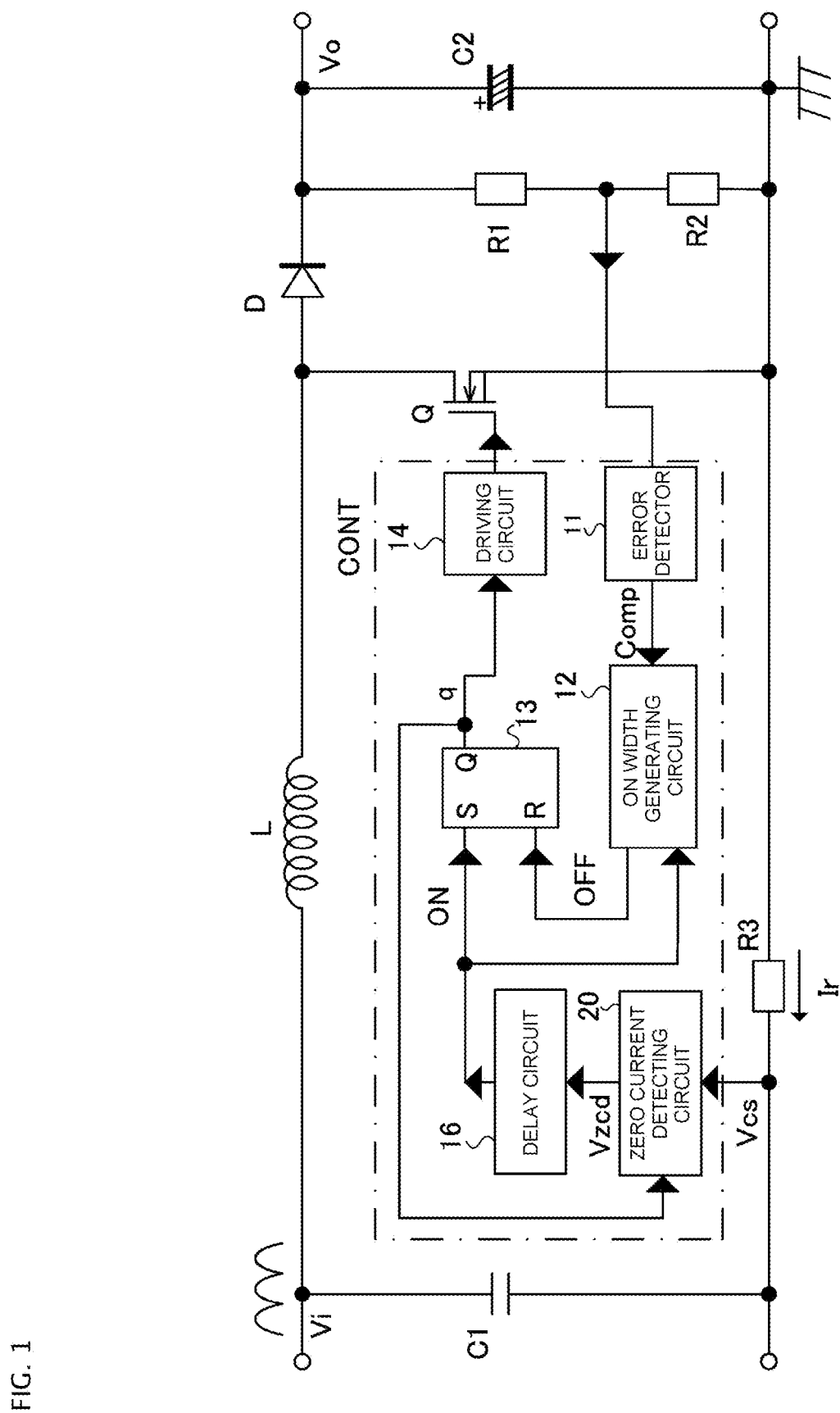
FIG. 1 shows a schematic construction of a switching power supply device of embodiments of the present invention.
Figure 2:
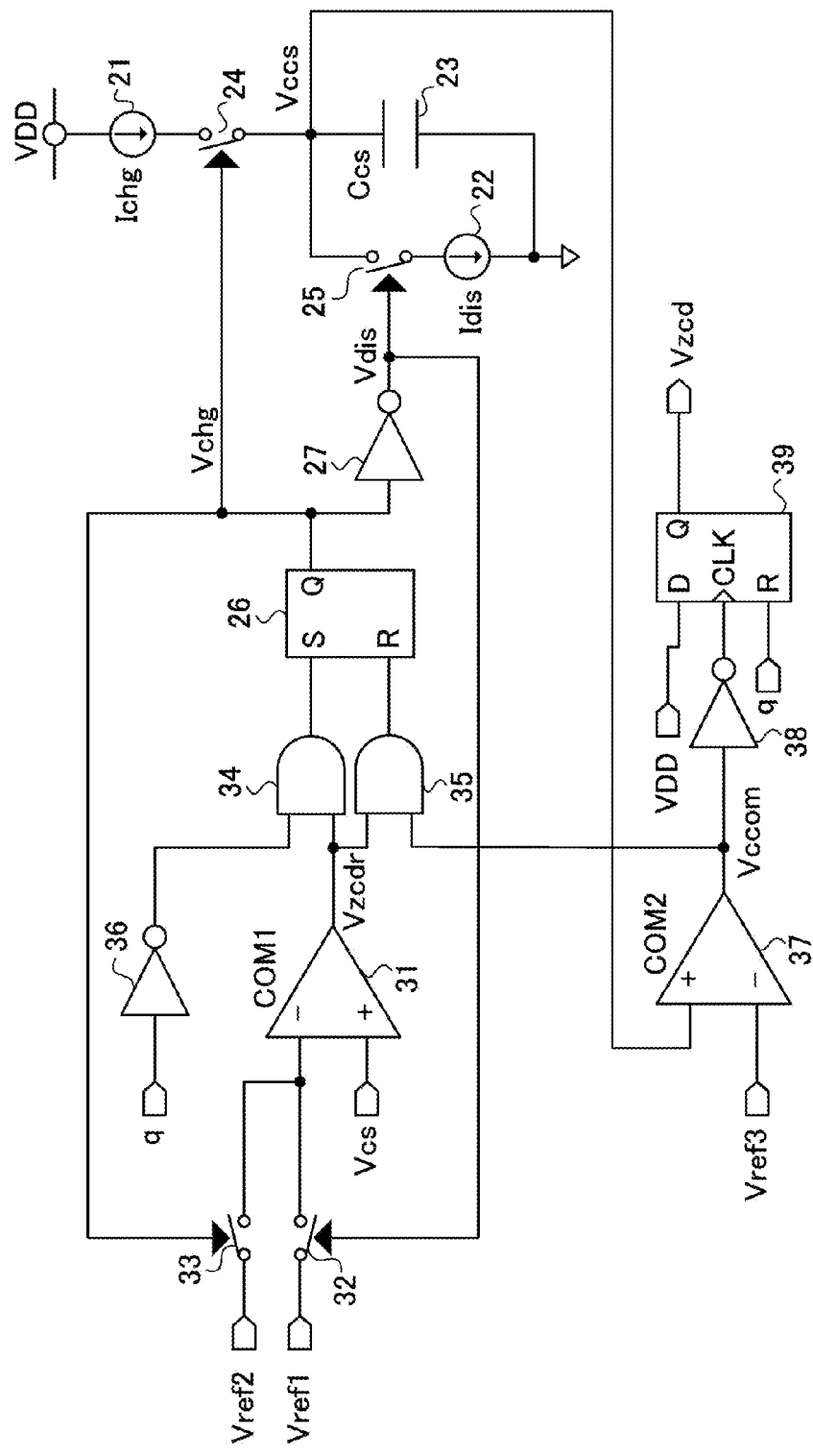
FIG. 2 shows an example of construction of the zero current detecting circuit indicated in FIG. 1.
Figure 4:
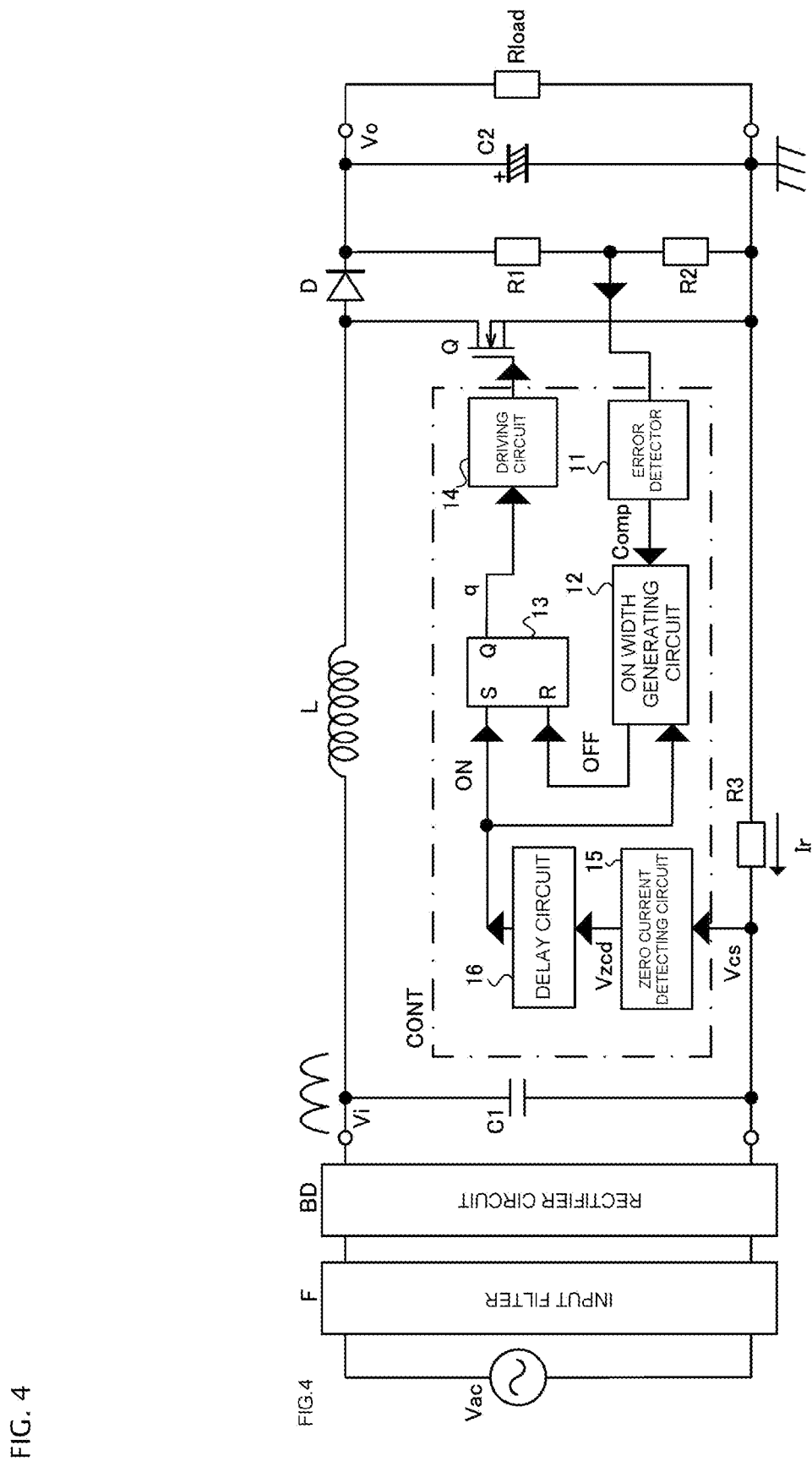
FIG. 4 shows a schematic construction of a conventional switching power supply device.
Figure 5:
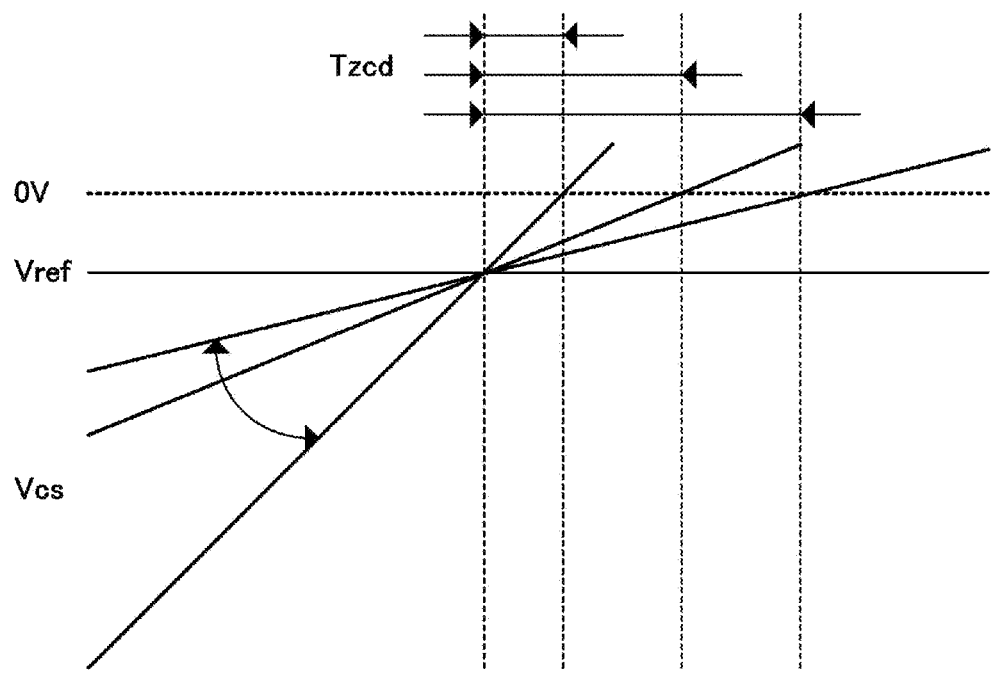
FIG. 5 illustrates a relationship between the delay time Tzcd and the detection voltage Vcs proportional to the inductor current to explain the problem in zero current detection.
Figure 6:
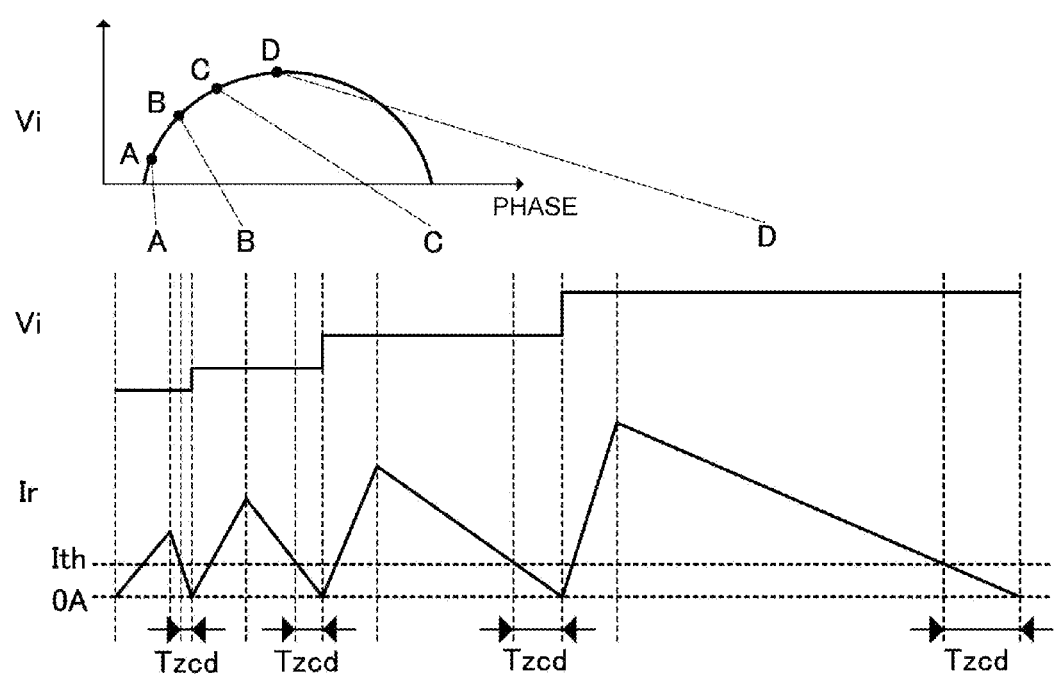
FIG. 6 shows a relationship between the delay time Tzcd and the input voltage Vi that varies instantaneous value thereof depending on the phase.

FIG. 1 shows a schematic construction of a switching power supply device 1, a power factor correction converter, of a step-up chopper type of the embodiment; and FIG. 2 shows a schematic construction of a zero current detecting circuit 20 in the switching power supply device 1 shown in FIG. 1. In FIG. 1, the same parts as those in the switching power supply device of FIG. 4 are given the same symbols. The input filter F and the rectifier circuit BD are omitted in FIG. 1. Redundant repeating description is omitted for the same parts as those in the conventional switching power supply device.

The switching power supply device 1 of this embodiment is characterized in that the output q of the flip-flop 13 is given to the zero current detecting circuit 20 that is constructed as shown in FIG. 2. The zero current detecting circuit 20 is constructed so that the zero current detection is carried out from a gradient of the voltage Vcs, which is a negative voltage proportional to the inductor current Ir detected with the resistor R3.

Specifically, the zero current detecting circuit 20 comprises a capacitor 23 (Ccs) that is charged with a constant current Ichg by a first constant current source 21 and discharged with a constant current Idis by a second constant current source 22. A first switch 24 controls the charging of the capacitor 23 by the first constant current source 21; and a second switch 25 controls the discharging of the capacitor 23 by the second constant current source 22. The first and the second switches 24 and 25 are ON/OFF-controlled reciprocally by the output of a flip-flop (FF) 26. This flip-flop 26 is of a reset preference type.

A first comparator 31 (COM1), which receives the voltage Vcs proportional to the inductor current Ir, is given alternatively a first comparison reference voltage Vref1 through a third switch 32 or a second comparison reference voltage Vref2 larger than Vref1 through a fourth switch 33. The third and fourth switches 32 and 33 are also ON/OFF controlled reciprocally by the output from the flip-flop 26.

More specifically, when the flip-flop 26 is set, the output Vchg thereof turns ON the first switch 24 to charge the capacitor 23 and also turns ON the fourth switch 33 to give the second comparison reference voltage Vref2 to the first comparator 31. When the flip-flop 26 is reset, the signal Vdis that is the output Vchg of the flip-flop 26 inverted through the inverter 27 turns ON the second switch 25 to discharge the capacitor 23 and also turns ON the third switch 32 to give the first comparison reference voltage Vref1 to the first comparator 31.

Consequently, the first comparator 31, in the condition of the flip-flop 26 reset, compares the voltage Vcs proportional to the inductor current Ir with the first comparison reference voltage Vref1 and when the voltage Vcs exceed the first comparison reference voltage Vref1, delivers a signal Vzcdr. The first comparator 31, in the condition of the flip-flop 26 set, compares the voltage Vcs proportional to the inductor current Ir with the second comparison reference voltage Vref2, and when the voltage Vcs exceeds the second comparison reference voltage Vref2, delivers the signal Vzcdr.

The output signal Vzcdr from the first comparator 31 is delivered through the first gate circuit 34 to the set terminal of the flip-flop 26 and at the same time, through the second gate circuit 35 to the reset terminal of the flip-flop 26. The first gate circuit 34 is gate-controlled by the output q of the flip-flop 13 given through an inverter 36. Consequently, the first gate circuit 34 is active in the period of time excepting ON state of the switching element Q brought about by the output q of the flip-flop 13, or active in the OFF state of the switching element Q. The second gate circuit 35 becomes active receiving an output signal Vccom of a second comparator 37 as described below.

The second comparator 37 compares the charging or discharging voltage Vccs across the capacitor 23 with a preset third comparison reference voltage Vref3, and delivers the signal Vccom when the voltage Vccs exceeds the third comparison reference voltage Vref3. The output signal Vccom of the second comparator 37 is delivered through an inverter 38 to a clock terminal of a D type flip-flop 39 as well as used for gate-controlling the second gate circuit 35 as described above. The D type flip-flop 39 receives the power supply voltage VDD at the D terminal thereof and the output q of the flip-flop 13 described earlier at the reset terminal. At a timing of rise up of the signal Vccom given to the clock terminal, the D type flip-flop 39 takes in the power supply voltage VDD given to the D terminal and delivers the signal Vzcd indicating zero current detection.

Figure 3:
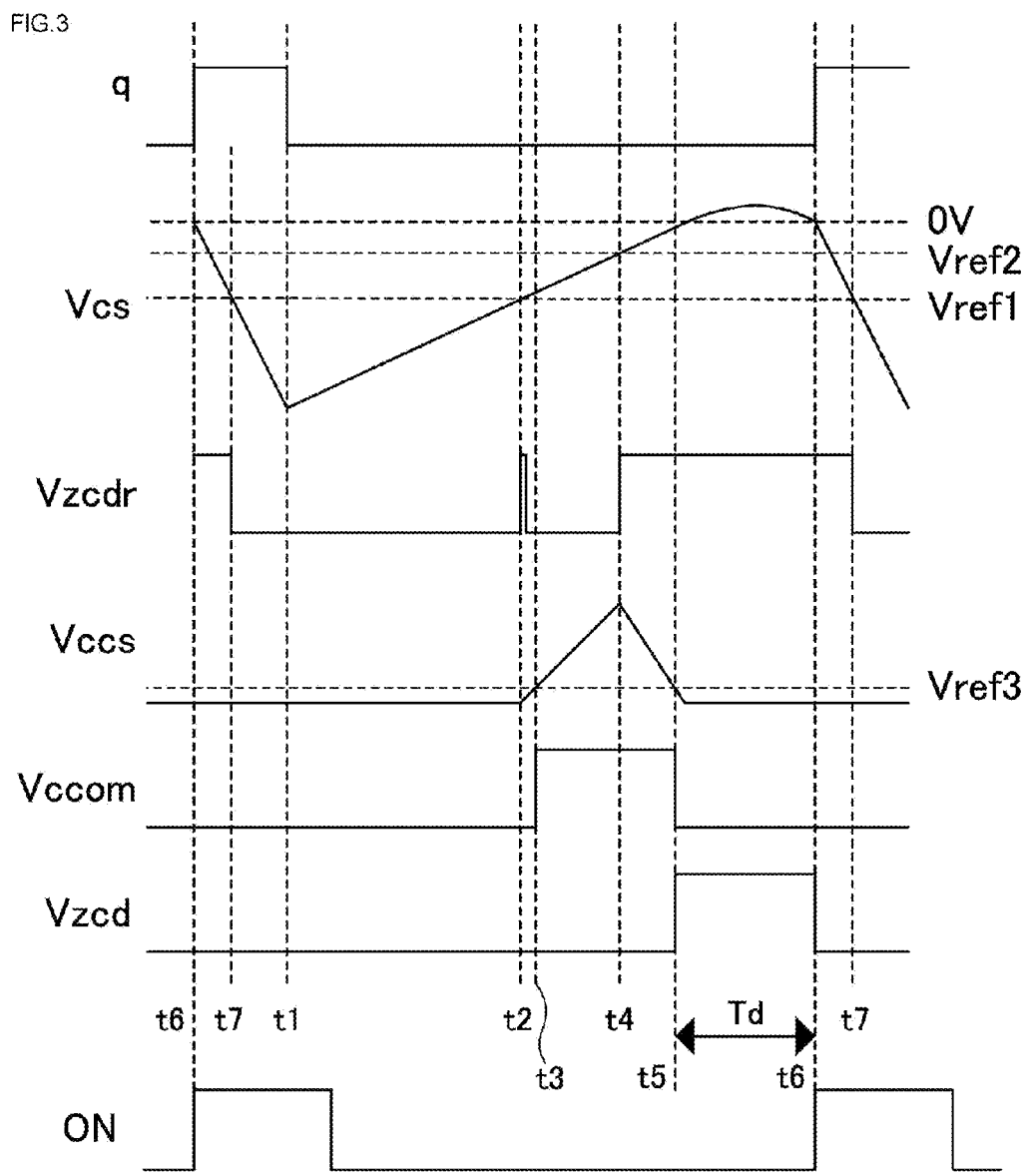
FIG. 3 is a timing chart showing operation of the zero current detecting circuit shown in FIG. 2.

The following describes, with reference to the timing chart shown in FIG. 3, the operation of the zero current detecting circuit 20 having the construction described above. In the ON period of the switching element Q that is ON/OFF controlled by the output q of the flip-flop 13, an electric current flows into the inductor L. The voltage Vcs, which develops across the resistor R3 in proportion to the inductor current Ir, falls down below zero volts or increases in the absolute value of a negative voltage. Upon turning OFF of the switching element Q, an electric current flows out of the inductor L. The voltage Vcs, which develops across the resistor R3 in proportion to the inductor current Ir rises or decreases in the absolute value of a negative voltage. The inductor current Ir further swings to the negative side by resonant oscillation caused by the inductance of the inductor L and a parasitic capacitance component in the circuit of the current path including the inductor L. Accompanying the oscillation of the inductor current, the voltage Vcs swings to the positive side in a waveform of resonant arc.

In order to detect a gradient of the inductor current Ir in the OFF state of the switching element Q, the zero current detecting circuit 20 compares the negative voltage Vcs proportional to the inductor current Ir with the first comparison reference voltage Vref1 and the second comparison reference voltage Vef2 and controls charging and discharging of the capacitor 23 to generate the signal Vccom having a pulse width corresponding to the gradient of the inductor current Ir.

Specifically, in the reset state of the flip-flop 26, the second switch 25 is in the ON state keeping the capacitor in a discharging state and the third switch 32 is in the ON state giving the first reference voltage Vref1 to the first comparator 31. When the output q of the flip-flop 13 turns to a Low level at a timing t1 in this state, the High level signal inverted from the signal q by the inverter 36 is given to the first gate circuit 34 as an input signal. When the voltage Vcs exceeds the first comparison reference voltage Vref1 at the timing t2, the output signal Vzcdr from the first comparator 31 is given through the first gate circuit 34 to the flip-flop 26 to set the flip-flop 26.

As a consequence of setting of the flip-flop 26, the second and third switches 25 and 32 are turned OFF and instead of these, the first and fourth switches 24 and 33 are turned ON. As a result, the capacitor 23 starts to be charged through the first switch 24, and the second comparison reference voltage Vref2 is given to the first comparator 31 through the fourth switch 33. Accompanying the change of comparison reference voltage giving to the first comparator 31, the first comparator 31 stops delivering the signal Vzcdr. Thus, the signal Vzcdr is delivered, when the voltage Vcs exceeds the first comparison reference voltage Vref1 at the timing t2, as a single shot during the time, 20 ns for example, corresponding to response delay of the circuit.

The capacitor 23 thus starts to be charged and the charging and discharging voltage Vccs thereof is given to the second comparator 37 and compared with the third comparison reference voltage Vref3 given to the second comparator 37. The third comparison reference voltage Vref3 is set at a value sufficiently lower than the peak value of the charging and discharging voltage Vccs charged on the capacitor 23. Consequently, the second comparator 37 delivers a signal Vccom at a timing t3 immediately after start of charging on the capacitor 23. The signal Vccom is given to the second gate circuit 35 as an input signal.

After that, when the voltage Vcs exceeds the second comparison reference voltage Vref2 at a timing t4, the first comparator 31 delivers the signal Vzcdr again. The signal Vzcdr is given through the first and second gate circuits 34 and 35 to the set terminal and the reset terminal, respectively, of the flip-flop 26. However, the flip-flop 26 is of a reset preference type. Thus, the flip-flop 26 is reset on receiving the signal Vzcdr.

Accompanying the reset of the flip-flop 26, changeover is performed on the first through fourth switches 24, 25, 32 and 33, and the first comparator 31 is given the first comparison reference voltage Vref1 again. At the same time, the capacitor 23 stops charging and starts discharging by the second constant current source 22. The charging current Ichg onto the capacitor 23 by the first constant current source 21 and the discharging current Idis from the capacitor 23 by the second constant current source 22 are determined in relation to the first and second comparison reference voltages Vref1 and Vref2 as the following equation, for example.

$$Idis/Ichg = (Vref1 - Vref2)/Vref2$$

When the charging and discharging voltage Vccs of the capacitor 23 decreases to the third comparison reference voltage Vref3 at the time t5, the second comparator 37 stops delivering the signal Vccom. The stop of the output signal Vccom of the second comparator 37 closes the second gate circuit 35 again. The D type flip-flop 39 receiving the signal Vccom through the inverter 38 to the clock terminal takes in the power supply voltage VDD given to the D terminal due to the stop of the Vccom output, and delivers the zero current detecting signal Vzcd.

Consequently, the timing t5 at which the zero current detecting signal Vzcd is delivered corresponds to the gradient of the voltage Vcs during the period from the timing t2 to the timing t4, where the timing t2 is the time at which the voltage Vcs proportional to the inductor current exceeds the first comparison reference voltage Vref1 and the timing t4 is the time at which the voltage Vcs exceeds the second comparison reference voltage Vref2. When the first comparison reference voltage Vref1 is set at −20 mV, and the second comparison reference voltage Vref2 is set at −10 mV, for example, the zero current detecting signal Vzcd is delivered accurately at the timing of zero volts of the voltage Vcs proportional to the inductor current Ir.

Thus, the zero current detecting signal Vzcd is delivered at the timing t5 of zero volts of the voltage Vcs from the D type flip-flop 39 or from the zero current detecting circuit 20. The zero current detecting signal Vzcd is given to the flip-flop 13 after delaying in the delay circuit 16 by a certain time Td (see the signal ON in FIG. 3) to reset the flip-flop 13. The setting of the flip-flop 13 turns ON the switching element Q at the timing t6. Thus, the switching element Q is turned ON at the timing t6 at which the resonant oscillation voltage is at the valley thereof and the voltage to which the switching element Q is subjected is the lowest. Therefore, the switching efficiency of the switching element Q is not deteriorated. The peak of the inductor current Ir can be matched to the instantaneous value corresponding to the phase of the input voltage Vi and the peak waveform of the inductor current Ir is same as the waveform of the input voltage Vi, so the power factor is improved.

At the timing t6 when the switching element Q turns ON, the output q from the flip-flop 13 resets the D type flip-flop 39 and makes the first gate circuit 34 inactive through the inverter 36. At this timing t6, the second gate circuit 35 is inactive because of output stop of the signal Vccom from the second comparator 37. Thus, upon turning ON of the switching element Q, the signal Vzcdr is not delivered to the flip-flop 26 even though the voltage Vcs proportional to the inductor current Ir is higher than the first comparison reference voltage Vref1 and the signal Vzcdr is on standby at the output terminal of the first comparator 31.

Because an electric current flows in to the inductor L again in the ON period of the switching element Q, the voltage Vcs proportional to the inductor current Ir decreases, or the absolute value of the negative voltage increases, from zero volts with increase of the inductor current Ir. When the voltage Vcs decreases below the first comparison reference voltage Vref1 at the timing t7, the first comparator 31 stops delivering the signal Vzcdr. Even though the output of the first comparator 31 changes, the state of the flip-flop 26 does not change because the first and second gate circuits 34 and 35 are both kept closed. Thus, the discharging state of the capacitor 23 is held over the ON period of the switching element Q, preparing for charging and discharging in the OFF period of the switching element Q.

In some embodiments of the switching power supply device having the above-described construction, the control circuit thereof accurately detects the timing of zero return of the inductor current Ir flowing out of the inductor L during OFF period of the switching element Q. Moreover, the zero current detection can be performed using large threshold values: first and second comparison reference voltages Vref1 and Vref2. Consequently, the noise superimposed on the power supply line does not adversely affect the accurate detection of the zero current timing. Therefore, the switching power supply device of the invention achieves improvement in the power factor and switching efficiency as well as accurate and stable operation.

Embodiments of the invention are not limited to the embodiments described thus far. The gradient of the inductor current Ir can be obtained, for example, by differentiation processing of the voltage Vcs proportional to the inductor current Ir when the voltage Vcs has reached a predetermined value. In this case, a zero current detecting signal Vzcd is delivered at the timing after passing a certain time determined corresponding to the gradient of the inductor current Ir from the timing of reaching the predetermined value of the voltage Vcs.

Although, in the above embodiments, the gradient of the voltage Vcs is detected by giving alternatively the first and second comparison reference voltages Vref1 and Vref2 to the first comparator 31, the set/reset control of the flip-flop 26 can be carried out by using two comparators: a comparator that receives the first comparison reference voltage Vref1 and another comparator that receives the second comparison reference voltage Vref2, and the output of the two comparators and the output q of the flip-flop 13 are logically processed. Any other modifications can be done within the scope and spirit of embodiments of the invention.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2012-115273, filed on May 21, 2012, the contents of which are incorporated herein by reference in their entirety.

What is claimed is:

1. A switching power supply device that includes:
   an inductor connected to a rectifier circuit for rectifying AC power,
   a switching element forming a current path from the rectifier circuit through the inductor in an ON state of the switching element;
   a diode forming a current path from the inductor to an output capacitor in an OFF state of the switching element; and
   a control circuit controlling electric current flowing through the inductor by ON/OFF driving the switching element;
   the control circuit comprising:
      a zero current detecting circuit that detects a gradient of current flowing through the inductor in an OFF state of the switching element and detects a timing of zero current flowing through the inductor corresponding to the detected gradient to turn ON the switching element, and
      an ON width generating circuit that compares a comparison reference voltage generated based on an output voltage obtained at the output capacitor with a ramp voltage generated upon turning ON of the switching element to determine an ON width of the switching element, and turns OFF the switching element;
   wherein the zero current detecting circuit
   receives a signal for controlling ON/OFF driving of the switching element,
   receives a voltage signal proportional to the current flowing through the inductor in an OFF state of the switching element,
   compares the voltage signal sequentially with a first comparison reference voltage and a second comparison reference voltage,
   detects a gradient of the current flowing through the inductor, and
   detects the timing of zero current flowing through the inductor corresponding to the detected gradient of current; and wherein the zero current detecting circuit comprises a capacitor that is charged by a first constant current source and discharged by a second constant current source,
   charges the capacitor by the first constant current source after the voltage signal exceeds the first comparison reference voltage until the voltage signal reaches the second comparison reference voltage,
   then discharges a charged voltage of the capacitor by the second constant current source, and
   detects a timing at which the charged voltage of the capacitor reaches a third comparison reference voltage through the discharge as the timing of zero current flowing in the inductor.

2. The switching power supply device according to claim 1, wherein the zero current detecting circuit gives an output signal of the detected timing of zero current flowing in the inductor to an output control circuit for ON/OFF driving the switching element through a delay circuit for delaying by a predetermined period of time, the output control circuit comprising a flip-flop that is reset by an output of the ON width generating circuit and set by an output of the delay circuit, and a driving circuit that generates a driving signal for the switching element according to an output of the flip-flop.

3. The switching power supply device according to claim 1, wherein the zero current detecting circuit detects the gradient of the current flowing through the inductor from a differential value of the current in the OFF state of the switching element and detects the timing of zero current flowing through the inductor corresponding to the detected gradient of current.

4. A switching power supply device that includes:
   an inductor connected, at a first side of the inductor, to a rectifier circuit for rectifying AC power,
   a switching element forming a current path from the rectifier circuit through the inductor in an ON state of the switching element;
   a diode forming a current path from a second side of the inductor to an output capacitor in an OFF state of the switching element; and
   a control circuit controlling electric current flowing through the inductor by ON/OFF driving the switching element;
   the control circuit comprising:
      a zero current detecting circuit that detects a gradient of current flowing through and out the second side of the inductor in an OFF state of the switching element and detects a timing of zero current flowing through and out the second side of the inductor corresponding to the detected gradient to turn ON the switching element, and
      an ON width generating circuit that compares a comparison reference voltage generated based on an output voltage obtained at the output capacitor with a ramp voltage generated upon turning ON of the switching element to determine an ON width of the switching element, and turns OFF the switching element;
   wherein the zero current detecting circuit
   receives a signal for controlling ON/OFF driving of the switching element,
   receives a voltage signal proportional to the current flowing through the inductor in an OFF state of the switching element,
   compares the voltage signal sequentially with a first comparison reference voltage and a second comparison reference voltage,
   detects a gradient of the current flowing through the inductor, and detects the timing of zero current flowing through the inductor corresponding to the detected gradient of current; and wherein the zero current detecting circuit comprises a capacitor that is charged by a first constant current source and discharged by a second constant current source, charges the capacitor by the first constant current source after the voltage signal exceeds the first comparison reference voltage until the voltage signal reaches the second comparison reference voltage, then discharges a charged voltage of the capacitor by the second constant current source, and detects a timing at which the charged voltage of the capacitor reaches a third comparison reference voltage through the discharge as the timing of zero current flowing in the inductor.

\* \* \* \* \*